May 17, 1966     A. H. SMITH     3,252,022
CONTROL FOR ELECTRICAL COUPLING APPARATUS
Filed March 5, 1964     4 Sheets-Sheet 1
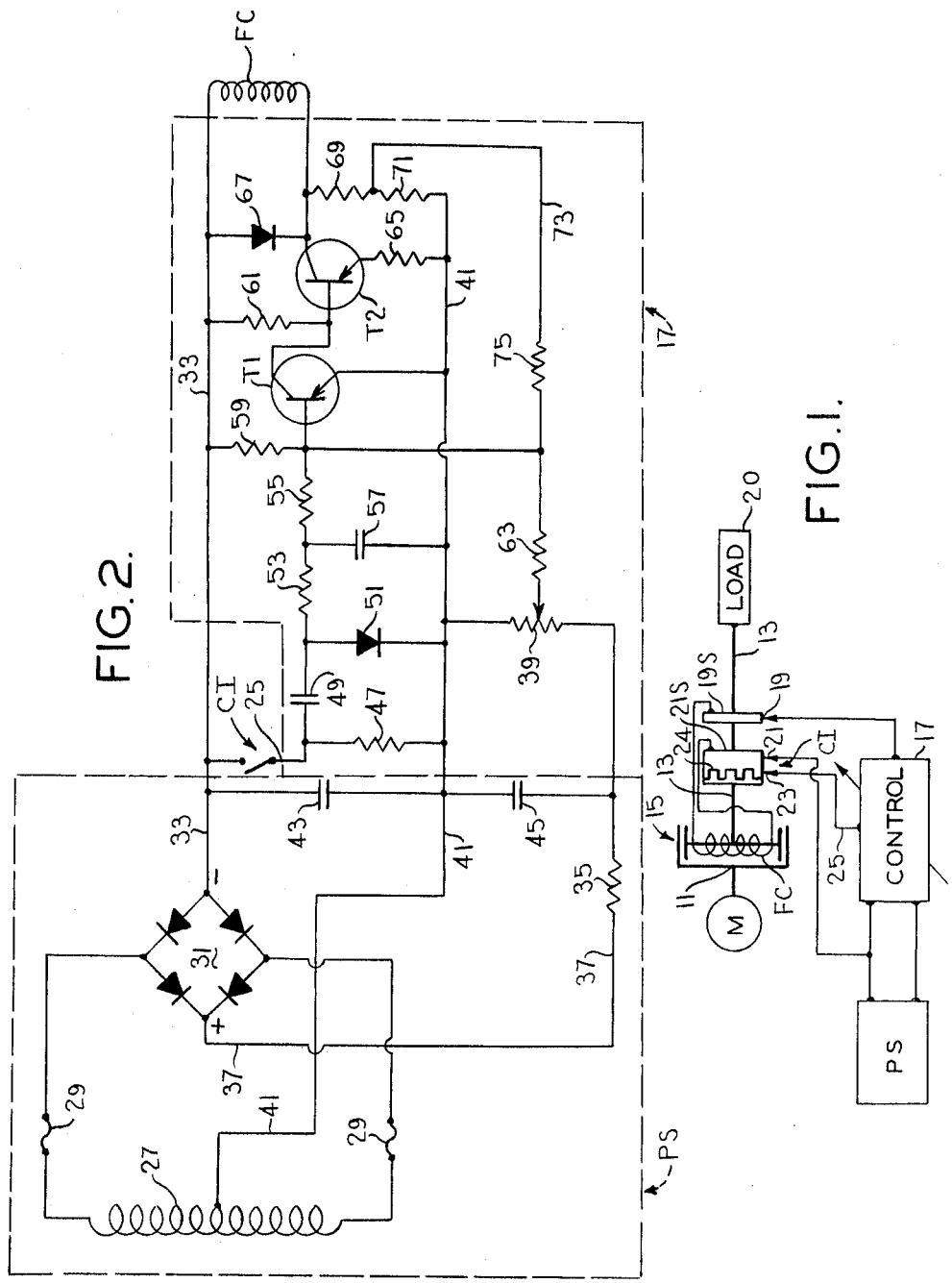

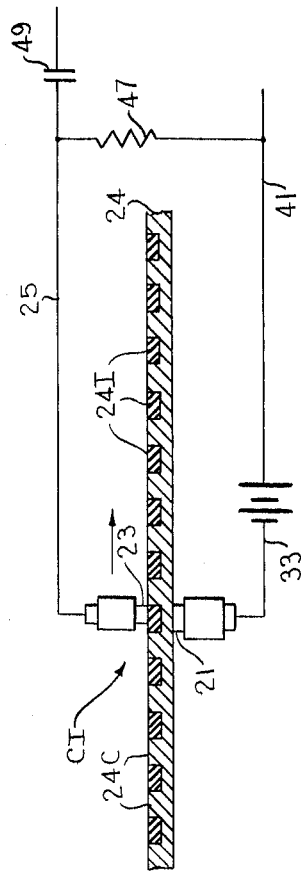
FIG. 3.
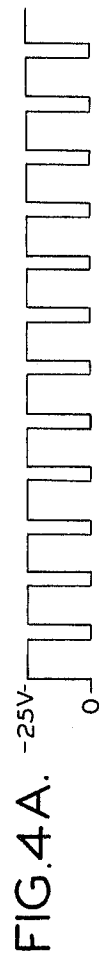
FIG. 4A. -25V- 0
FIG. 4B. -25V- 0
FIG. 4C. -10V- 0-
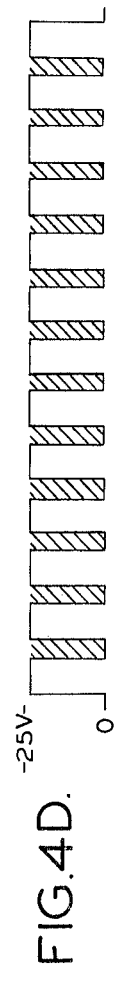
FIG. 4D. -25V- 0

May 17, 1966  A. H. SMITH  3,252,022
CONTROL FOR ELECTRICAL COUPLING APPARATUS
Filed March 5, 1964  4 Sheets-Sheet 3

United States Patent Office 3,252,022
Patented May 17, 1966

3,252,022
CONTROL FOR ELECTRICAL COUPLING
APPARATUS
Aubrey Harris Smith, Kenosha, Wis., assignor to Eaton Manufacturing Company, Cleveland, Ohio, a corporation of Ohio
Filed Mar. 5, 1964, Ser. No. 349,707
13 Claims. (Cl. 310—95)

This invention relates to a control for electrical coupling apparatus, and more particularly to an electronic system for regulating the angular velocity of a rotating shaft.

This application is a continuation-in-part of my application Serial No. 230,335, filed October 15, 1962, for Control for Electrical Coupling Apparatus.

Among the several objects of this invention may be noted the provision of a control for energizing a field coil associated with electrical coupling apparatus for regulating the angular velocity of a rotating shaft; the provision of such a control which employs as active components only solid state devices, and wherein the thermal dissipation in certain of these devices is appreciably reduced; the provision of a control for regulating the speed of a rotating shaft in which response time is greatly reduced; the provision of a control of the class described which avoids the use of conventional tachometer generators customarily employed to sense shaft speeds; and the provision of a control for electrical coupling apparatus which is more compact, less expensive and yet rugged and reliable in operation. Other objects and features will be in part apparent and in part pointed out hereinafter.

In its broader aspects, the invention is directed to a control for electrical coupling apparatus having a rotating shaft and a field coil for varying the angular velocity of this shaft. This control comprises an amplifier including a transistor having a control element adapted to control the conductivity of this transistor between a conducting state and a cutoff state. The field coil is energized by the amplifier when the transistor is in its conducting state, but is deenergized when this transistor is cut off. Also included in the control are means for repetitively pulsing the transistor between its conducting and cutoff states, and for controlling the relative ratio between the periods of conducting and cutoff, thereby to variably energize the field coil. This pulsing and controlling means includes a D.C. power source, a differentiating network, circuit interrupting means, a clipper, and integrating network, and a D.C. potential source which supplies a D.C. reference voltage having a magnitude which is a function of a preselected angular velocity of the shaft. The circuit interrupting means interconnects the power source to the differentiating network and is responsive to rotation of the shaft to supply to this network D.C. square-wave pulses having a repetition rate which is a function of the angular velocity of the shaft. In a specific embodiment of this invention, the circuit interrupting means is constituted by a stationary brush in contact with a body having alternate conductive and insulating portions which are rotated by said shaft relative to the brush, thereby sequentially to connect and disconnect the D.C. power source and the differentiating network. The differentiated voltage pulses are clipped to limit the amplitudes of the differentiated square-wave pulses of one amplitude. The clipped differentiated voltages pulses are fed to an integrating network which provides a pulsating D.C. signal having an average D.C. potential level which is a function of the angular velocity of the shaft. This pulsing and controlling means is interconnected by an electrical circuit to the transistor control element whereby the relative ratio between conduction and cut off periods of said transistor is a function of the difference between the magnitudes of the pulsating D.C. signal and the D.C. reference voltage. The result is that the average level of the electrical power supplied to the field coil is controlled to maintain the angular velocity of the shaft substantially equal to the preselected angular velocity. The invention accordingly comprises the constructions hereinafter described, the scope of the invention being indicated in the following claims.

In the accompanying drawings in which two of various possible embodiments of the invention are illustrated, FIG. 1 schematically illustrates electrical apparatus in which the angular velocity of a rotating shaft is controlled in accordance with this invention;

FIG. 2 is a circuit diagram of a first embodiment of the present invention;

FIG. 3 is a diagrammatic view of a circuit interrupting component of an electrical coupling control of this invention;

FIGS. 4A–4D are wave forms useful in explaining the operation of the control of FIG. 1;

Corresponding reference characters indicate corresponding parts throughout the drawings.

Figure 5:
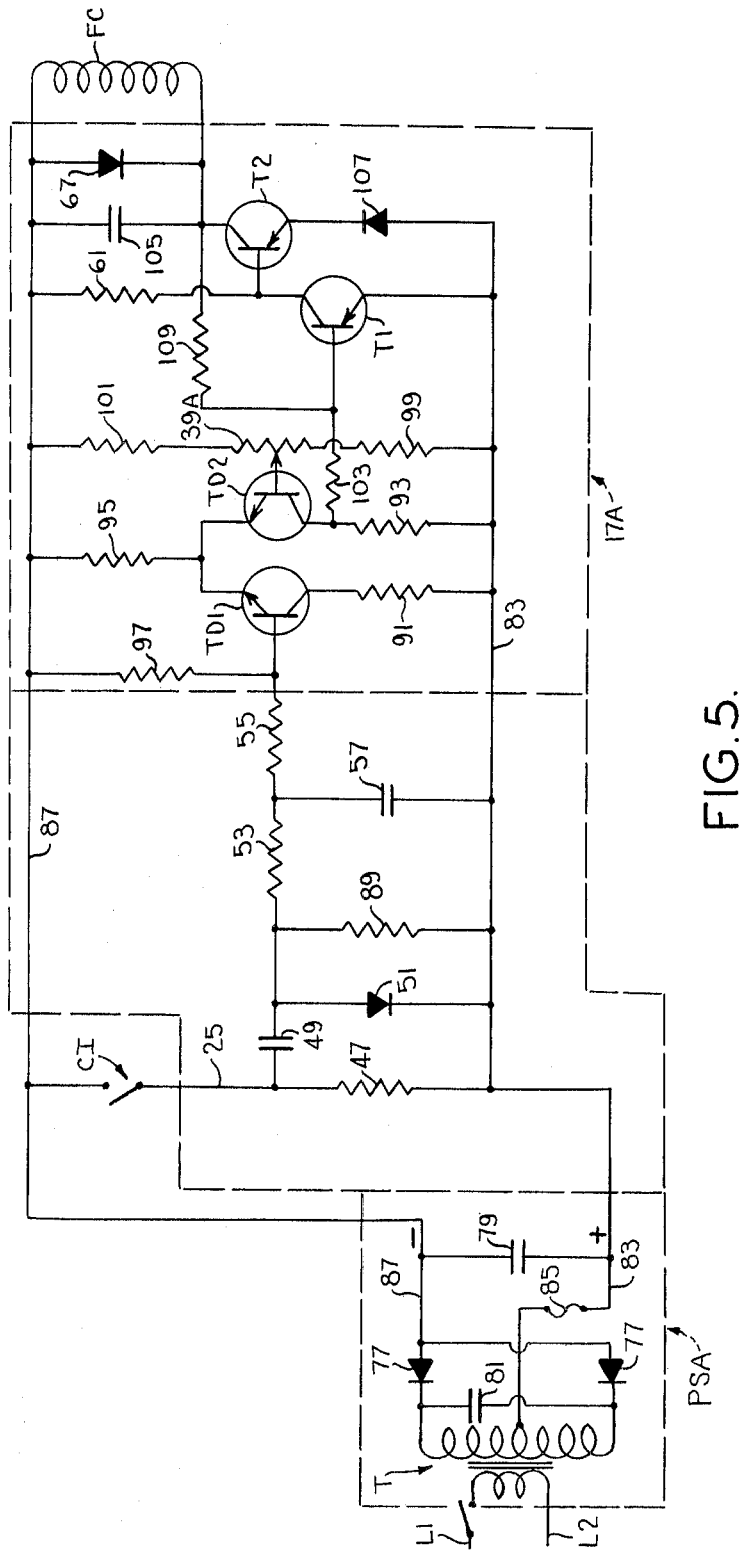
FIG. 5 is a circuit diagram of a second embodiment of this invention.

Referring now to the drawings, FIG. 1 illustrates electrical apparatus having a driving member 11, a driven member 13 and an electromagnetic coupling device 15. Driving member 11 is constituted by a rotating shaft driven by any suitable means, for example, by an electrical motor M. Driven member 13 is a rotating shaft, the angular velocity of which is to be controlled or regulated according to this invention. Coupling device 15 includes a field coil FC energized by the output of a control 17. The average power supplied to field coil FC by control 17 controls the degree of coupling between driving member 11 and driven member 13, and thereby determines the angular velocity of this driven member. Control 17 includes means for preselecting a desired angular velocity of shaft 13. Torque is transferred through shaft 13 to a load indicated at 20.

The D.C. power for variably energizing clutch coil FC is supplied by a D.C. power source PS to control 17 and, via brushes 19 and 21 and slip rings 19S and 21S, to the field coil. A circuit interrupting device CI including a stationary brush 23 and a cylindrical body 24 having alternate conductive and insulating portions, which is coaxially mounted on shaft 13 for rotation therewith, sequentially connects and disconnects one terminal of power source PS to an input terminal of control 17 by means of brush 23 and a conductor 25. The developed diagrammatic view of FIG. 3 illustrates alternate insulating portions or segments 24I and conductive segments or portions 24C of CI. Circuit interrupting means CI constitutes a switch having a make-and-break frequency dependent on the angular velocity of shaft 13 and thus supplies to control 17 D.C. square-wave voltage pulses having a frequency or repetition rate which is a function of the angular velocity of shaft 13. Control 17 is responsive to this rate of pulse repetition to energize field coil FC to maintain the angular velocity of shaft 13 at any preselected value under conditions of varying load, etc.

Referring now to FIG. 2, power supply PS is shown to include a source of A.C. power constituted by a center-tapped inductor 27, which may be either a secondary winding of a transformer or a motor winding associated with motor M, connected via fuses 29 to a bridge-type rectifier 31. One output terminal of bridge 31 is commonly connected to control 17, circuit interruptor CI and one terminal of field coil FC by a conductor 33. The opposite or positive polarity output bridge rectifier terminal connected through a resistor 35 and a conductor 37 to one terminal of a speed setting reference voltage potentiometer 39. The neutral or center-tap terminal of winding 27 is connected to control 17 by a conductor 41 which constitutes the common bus for this control. A pair of filter capacitors 43 and 45 are connected respectively across conductors 33 and 41, and conductors 37 and 41, the polarity of 33 being negative relative to 41 while conductor 37 is positive relative to common bus 41. Thus, power source PS is a compound power supply with leads 33 and 41 providing a D.C. power source for the control 17 and field coil FC, while leads 37 and 41 provide a D.C. potential source for control 17.

The D.C. square-wave voltage pulses, developed by commutator or circuit interrupter CI and illustrated in FIG. 4A, are applied across a resistor 47 which together with a capacitor 49 constitutes a differentiating network. A diode 51, which serves to limit or clip the positive polarity peaks or spikes of the differentiated square-wave pulses, is connected across the differentiating network output thereby modifying the wave form to that shown in FIG. 4B. These differentiated clipped D.C. square-wave pulses are then integrated by an integrating network comprising resistors 53, 55 and a capacitor 57 connected from the junction of these resistors to bus 41. This integrating network develops a pulsating D.C. voltage having a wave shape substantially as shown in FIG. 4C, and an average amplitude or magnitude which is a function of the angular velocity of driven shaft 13. This pulsating D.C. signal is impressed across the base-emitter circuit of a transistor T1 which has its base and collector elements respectively connected to the positive polarity conductor 33 by resistors 59 and 61. Also connected in parallel across T1's base-emitter circuit is a proportion of the D.C. potential applied by conductors 37 and 41 to the fixed resistance of potentiometer 39, the movable contact of which is connected via a resistor 63 to the base of T1. The D.C. potential between conductor 41 and the movable contact of potentiometer 39 is a D.C. reference voltage applied in parallel but in opposition to the pulsating D.C. signal from the integrating network to the control element or base of T1. Potentiometer 39 is preferably calibrated in shaft speed so that any preselected angular velocity of shaft 13 may be preset and establish a particular magnitude of D.C. reference voltage corresponding thereto.

A power transistor T2 has its base or control element connected to the collector of T1, and its emitter-collector circuit serially connected via a resistor 65 with field coil FC across the D.C. power source leads 33 and 41. A current-sustaining, transient-suppressing clamping diode 67 is connected in shunt across field coil FC. A voltage divider comprising a pair of resistors 69 and 71 is parallel-connected across the emitter-collector circuit of T2 and the junction of these resistors is interconnected by means of a conductor 73 and a resistor 75 to the base of transistor T1 to provide a positive or regenerative feedback signal from the output of power transistor T2 to the input of transistor T1. It will be noted that transistors T1 and T2 and their associated components collectively constitute a modified Schmitt trigger circuit monostable multivibrator, and that transistor T2 functions as a power amplifier stage with field coil FC being the electrical load.

The operation of the FIG. 2 control is as follows: The commutator or circuit interrupting device CI is driven by shaft 13 thereby interrupting the current path between brushes 21, 23 from negative polarity conductor 33 of power supply PS to the input of control 17 and applying across resistor 47 D.C. square-wave voltage pulses of negative polarity as illustrated in FIG. 4A, having a frequency which is proportional to shaft speed. The repetition rate of the "on" portions, i.e., the square-wave pulses, is therefore a function of the angular velocity of shaft 13, which is to be maintained at a preselected value under varying load conditions. The differentiating network, comprising resistor 47 and capacitor 49, differentiates the square-wave (the clipper diode 51 limiting the positive-going peaks) to form a signal having a wave shape as illustrated in FIG. 4B, each pulse of which is generally triangular with a constant base width. The pulse base width remains constant within the usual design frequency limits, e.g., up to a period equal to the resistance of resistor 47 times the capacitance of capacitor 49 times the constant, 4. Thus the area of each triangular pulse is independent of frequency or angular shaft speed, but the areas of these pulses integrated over a period of time are proportional to the angular velocity of shaft 13. The integrating network (resistors 53 and 55 and capacitor 57) integrates these triangular pulses to form the pulsating D.C. signal of FIG. 4C which therefore has an average D.C. potential level which is proportional to the angular velocity of shaft 13. As this pulsating D.C. potential is applied across the base-emitter circuit of transistor T1 in parallel opposition to the D.C. reference voltage between the upper end of potentiometer 39 and its movable contact, the algebraic sum of these two D.C. signals has an input signal level and wave shape as represented in FIG. 4C. As the polarity of the reference voltage applied to the base of transistor T1 is positive relative to the emitter of transistor T1 and the polarity of the pulsating D.C. signal from the integrating network applied to T1's base is negative relative to the emitter, an increase in the reference voltage level will tend to bias this transistor to its cutoff state while an increase in the D.C. pulsating signal level will tend to bias the transistor T1 to its "on" or conducting state. As the Schmitt trigger or monostable multivibrator circuit including transistors T1 and T2 is stable with T2 conducting and T1 nonconducting until the base of T1 is driven more negative than its trigger level, an increase in the reference potential will increase the ratio of T2's conducting period to its nonconducting periods (i.e., its duty cycle) while an increase of the magnitude of the pulsating D.C. signal from the integrating network will decrease the ratio of conducting periods to nonconducting periods of T2. Inasmuch as the average level of electrical power supplied to coil FC of coupling or clutch 15 is directly proportional to the ratio of conducting to nonconducting periods of transistor T2, the degree of coupling between driving member 13 and drive shaft 15 is varied by the instantaneous value of the composite or algebraic sum of the D.C. reference voltage and pulsating D.C. signal from the integrating network. This is illustrated in FIGS. 4C and 4D, the former representing the composite wave form at the base of transistor T1 with the monostable trigger level indicated by dashed line TL, and the latter showing the wave form of the collector potential of T2. At any D.C. reference voltage corresponding to a preselected shaft speed, an increase in the angular velocity of shaft 13 will tend to make the base of transistor T1 more negative and increase the proportion of each cycle during which the magnitude of the composite wave form is more negative than the trigger level TL, thus causing transistor T1 to be conducting a greater portion of each cycle. As transistor T2 is switched to a nonconducting state when transistor T1 conducts, an increase in shaft speed will decrease the proportion of each cycle during which transistor T2 conducts and thus decrease the average current through field coil FC and diminish the coupling between the driving member 11 and the driven shaft 13. This is illustrated in FIGS. 4C and 4D where an increase in shaft speed will move the composite wave shape upwardly increasing the proportion of each cycle during which the base of T1 is more negative than the trigger level TL. As the wave forms of FIG. 4D represents the collector-emitter potential of transistor T2, the shaded areas in FIG. 4D represent the periods of conduction of T2. Thus as the composite wave form of FIG. 4C is moved upwardly relative to trigger level TL the period or width of the conductive part of each cycle of transistor T2 is decreased.

Conversely, a decrease in the speed of shaft 13 (caused for example by an incipient increase in load 20) will decrease the magnitude of the pulsating D.C. voltage signal from the integrating network relative to the preselected reference voltage and a lesser portion of the composite wave form of FIG. 4C will be more negative than the trigger level TL. This may be represented in FIG. 4C by moving downwardly the wave form relative to the trigger level TL. Thus, transistor T1 will conduct a lesser portion of each cycle and T2 will conduct a greater portion of each cycle, thereby increasing the average current level and excitation of field coil FC to increase the degree of coupling between driving and driven members 11 and 13 to increase the speed of shaft 13 to its preselected level. This may be represented in FIG. 4D by an increase in the width of the shaded areas. Similarly any adjustment of the speed setting potentiometer 39 will apply a different D.C. reference voltage to the base of T1 and effect control of the angular velocity of shaft 13 at the new preselected value under varying conditions of loading.

Control 17 has very fast response and the modified Schmitt trigger circuit of transistors T1 and T2 provides high gains and steep wave-front rectangular wave shapes to field coil FC. The provision of the positive feedback from the collector of transistor T2 via conductor 73 to the base of transistor T1 contributes substantially to these desirable operating characteristics. Because transistors T1 and T2, and especially output transistor T2, are triggered or switched on and off, and the duty cycle or ratio of on and off periods of these transistors is varied to modify the field coil energization, the thermal dissipation in these transistors per unit of power transferred to the field coil is greatly reduced. This feature provides greater efficiency of power transfer to the field coil, thus permitting the use of power transistors having smaller continuous power ratings or capacity. This in turn lowers the cost of the control unit, and also insures greater reliability.

Referring now to FIG. 5, a second embodiment of a control of this invention is indicated generally at 17A with a modified power source PSA. This power source PSA differs from source PS in that transformer T is utilized as an A.C. power supply energized by lines L1 and L2, and a full wave rectifier, comprising diodes 77 and a filter capacitor 79, is employed to provide a simple rather than a compound power source. A diode protecting capacitor 81 is connected across the secondary winding of transformer T. A conductor 83, fuse-protected by a fuse link 85, is connected to the center tap of this transformer secondary and constitutes the positive polarity terminal or conductor of source PSA. The negative polarity terminal or conductor of PSA is indicated at 87 and is commonly connected to one terminal of the field coil FC and the circuit interrupter CI.

Control 17A has differentiating and integrating networks and a clipper identical to that shown in FIG. 2, except for the addition of a diode shunting resistor 89, and the components are therefore identically referenced. Control 17A, however, additionally employs a differential amplifier comprising two transistors TD1 and TD2 having respective collector resistors 91 and 93, a common emitter resisor 95, and a bias resistor 97. The output of the integrating network is connected to the base of transistor TD1, which constitutes one input (negative) of the differential amplifier. A speed setting potentiometer 39A has its fixed resistance connected via resistor 99 and 101 directly across the common or positive polarity bus or power source conductor 83 and the negative polarity power source conductor 87. The movable contact of potentiometer 39A is connected to the other input (positive) of the differential amplifier constituted by the base of transistor TD2. The composite of the pulsating D.C. signal from the integrating network fed to the base of TD1 and the adjustable D.C. reference voltage applied to the base of TD2 is developed across collector resistor 93 and this composite signal is coupled to the base of transistor T1 by means of a coupling resistor 103. The modified Schmitt trigger monostable multivibrator constituted by transistors T1 and T2 in control 17A is identical to that described and illustrated in FIG. 2, except that clamping diode 67 has a capacitor 105 shunt-connected across it and a reverse biasing diode 107 is connected in the emitter circuit of T2 instead of resistor 65 as shown in control 17. Capacitor 105 provides circuit protection from any high frequency transients generated by field coil FC while reverse-biasing diode 107 further decreases the heat dissipation of power transistor T2 so that this device can operate with a much smaller heat sink. Also, it will be noted that a positive feedback circuit between the collector of T2 and the base of T1 is employed in control 17A which differs somewhat from that used in control 17. In control 17A a resistor 109 provides this regenerative feedback path.

Figure 6A:
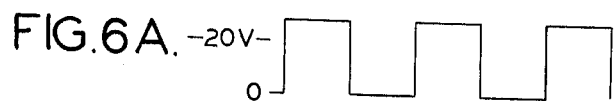
FIGS. 6A–6F are wave forms and an exemplary time base useful in explaining the operation of the control of FIG. 5.
Figure 6B:
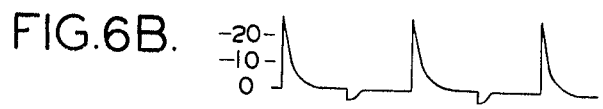
Figure 6C:
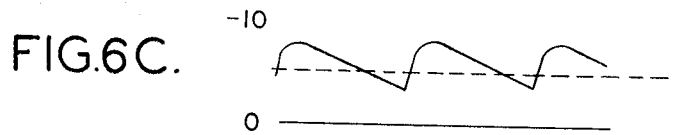

The operation of control 17A of FIG. 1 is substantially identical to that described above in regard to control 17. Thus the circuit interrupter CI provides D.C. square-wave voltage pulses as indicated in FIG. 6A, via conductor 25 to the input of the differentiating network, and the frequency of these pulses is a function of the speed of shaft 13. In FIG. 6A symmetrical square-wave pulses are shown. Such pulses may be generated by the circuit interrupter CI simply by modifying the relative lengths of the conducting and insulating segments 24C and 24I, and/or the width of brush 23 as will be apparent to one skilled in this art. FIG. 6B shows a representative wave form of this differentiated clipped square-wave signal applied to the integrating network, while FIG. 6C illustrates a typical pulsating D.C. signal developed by the integrating network and applied to the base of transistor TD1.

Figure 6D:
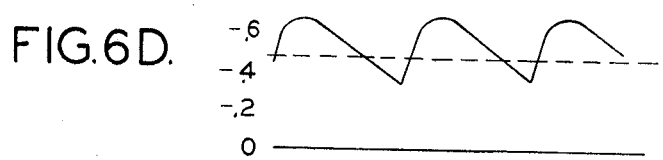
Figure 6E:
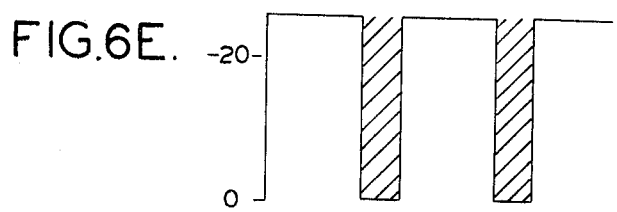
Figure 6F:
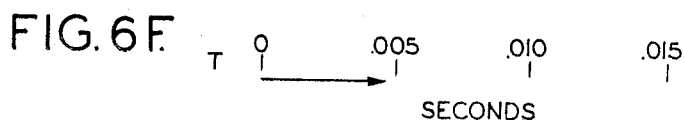

Control 17A by utilizing the differential amplifier between the control element of transistor T1 and the integrating network provides a significant advantage over control 17. The differential amplifier permits the use of a simple power source, such as PSA, rather than a compound power supply, e.g., that illustrated in FIG. 2 at PS. The differential amplifier in effect provides isolation so that potentiometer 39A can be directly connected in parallel with the same D.C. power conductors 83 and 87 that supply the field coil FC. Thus the positive input terminal of differential amplifier (the base of transistor TD2) can be directly connected to the movable contact of potentiometer 39A and have the D.C. reference voltage impressed thereon, while the pulsating D.C. signal from the integrating network is directly connected to the negative input (the base of transistor TD1) of the differential amplifier. The output signal of TD2 coupled through resistor 103 to the base of T1 is therefore the composite of the D.C. reference potential and the pulsating D.C. signal applied to the base of TD1 (times a constant which is the amplification factor of the differential amplifier). This composite signal applied to the base of transistor T1 is represented in FIG. 6D, the trigger level of this input transistor being indicated at TL. A representative wave shape of the emitter-collector potential of the T2 power transistor is shown in FIG. 6E, the conducting portion of each cycle being shaded. FIG. 6F illustrates a typical time base for the wave forms illustrated where the speed of shaft 13 is 500 r.p.m.

The operation of control 17A to increase and decrease the duty cycle or relative ratio of conducting to nonconducting periods of T2 in response to incipient changes in angular velocity of shaft 13, and thereby maintain the shaft speed substantially constant at any level preselected by the speed setting potentiometer 39A, is therefore essentially identical to that described above in regard to control 17 of FIG. 2. Thus as the shaft speed incipiently increases over the preselected value, the wave form of FIG. 6D will be moved upwardly and the conducting periods of transistor T2 will be reduced relative to its cutoff periods, and conversely an incipient decrease in shaft speed will decrease the magnitude of the pulsating D.C. signal, represented by a downward movement of the wave form of FIG. 6D, thus causing T1 to coduct a shorter period per cycle and T2 to conduct a longer period per cycle and thereby increase the excitation of field coil FC to increase the coupling and correct this incipient shaft speed decrease.

The use of a simple rather than a compound power source has another distinct advantage, and that is automatic compensation or cancellation of the effect of any change in the potential level of the D.C. power source across conductors 83 and 87. For example, any load-induced changes in this potential due to increased field coil excitation which would lower this D.C. potential will effectively proportionately change both the D.C. reference voltage level and the level of the pulsating D.C. signal, thereby effecting a cancellation of any such variation in the D.C. voltage level across conductors 83 and 87.

It will be understood that PNP and NPN types transistors may be employed interchangeably provided, of course, that the customary signal and supply voltage polarity reversals are made. Also, it will be noted that while field coil FC is illustrated as being energized directly by the output of transistor T2, this field coil may be indirectly controlled through a magnetic amplifier or other similar control device. Further, it will be understood that shaft 13 may be any driven member such as a sheave, quill, gear, etc.

In view of the above, it will be seen that the several objects of the invention are achieved and other advantages attained.

As various changes could be made in the above constructions without departing from the scope of the invention, it is intended that all matter contained in the above description or shown in the accompanying drawings shall be interpreted as illustrative and not in a limiting sense.

What is claimed is:

1. A control for electrical coupling apparatus having a rotating shaft and a field coil for varying the angular velocity thereof, said control comprising:
    an amplifier for energizing said field coil, said amplifier including a transistor having a control element adapted to control the conductivity of the transistor between a conducting state wherein said field coil is energized and a cutoff state wherein said field coil is deenergized;
    means for repetitively pulsing said transistor between its conducting and cutoff states and for controlling the relative ratio between the periods of conduction and cutoff thereby to variably energize said field coil, said pulsing and controlling means including:
        a D.C. power source,
        a differentiating network,
        circuit interrupting means interconnecting said power source to said differentiating network and responsive to rotation of said shaft thereby to supply to said network D.C. square-wave voltage pulses having a repetition rate which is a function of the angular velocity of said shaft,
        a clipper adapted to limit the amplitudes of the differentiated square-wave pulses of one polarity,
        an intergrating network adapted to integrate the clipped differentiated voltage pulses to supply a pulsating D.C. signal having an average D.C. potential level which is a function of angular velocity of the shaft,
        a D.C. potential source adapted to supply a D.C. reference voltage which has a magnitude which is a function of a preselected angular velocity of said shaft;
    said control further comprising an electrical circuit interconnecting said pulsing and controlling means to said control element whereby the relative ratio between conduction and cutoff periods of said transistor is a function of the difference between the magnitudes of said pulsating D.C. signal and said D.C. reference voltage and the average level of the electrical power supplied to said field coil is thereby controlled to maintain the angular velocity of said shaft substantially equal to said preselected angular velocity.

2. A control for electrical coupling apparatus as set forth in claim 1 in which said circuit interrupting means comprises a stationary brush in contact with a body having alternate conductive and insulating portions which are rotated by said shaft relative to said brush and adapted sequentially to connect and disconnect the D.C. power source and said differentiating network.

3. A control for electrical coupling apparatus as set forth in claim 1 wherein said electrical circuit interconnecting said pulsing and controlling means to said control element of said transistor includes a second transistor responsive to the difference between the magnitudes of said pulsating D.C. signal and said D.C. reference voltage for causing said first-mentioned transistor to be cut off during periods when said difference in magnitudes exceeds a predetermined level.

4. A control for electrical coupling apparatus as set forth in claim 3 wherein said pulsating D.C. signal and said D.C. reference voltage are applied in parallel to a control element of said second transistor.

5. A control for electrical coupling apparatus as set forth in claim 3 which further includes a differential amplifier interconnected between the integrating network and a control element of the second transistor, said differential amplifier having a first control element to which is applied said pulsating D.C. signal and a second control element to which is applied said D.C. reference potential, said differential amplifier having an output connected to the control element of said second transistor.

6. A control for electrical coupling apparatus as set forth in claim 5 in which the D.C. power source also constitutes the D.C. potential source whereby any load-induced changes in the D.C. voltage level of this D.C. power and potential source substantially equally affect the amplitudes of both the pulsating D.C. signal and the D.C. reference voltage thereby effecting a cancellation of said load-induced changes.

7. A control for electrical coupling apparatus as set forth in claim 6 in which the first-mentioned transistor includes a collector and an emitter, and which apparatus further includes a reverse biasing diode serially connected in a circuit interconnecting said power source with said transistor emitter-collector elements and said field coil.

8. A control for electrical coupling apparatus as set forth in claim 3 which further includes a regenerative feedback loop interconnecting an output element of the first-mentioned transistor to said control element of said second transistor.

9. A control for electrical apparatus having a driving member, a rotating driven member, and electrical coupling apparatus having a field coil for controlling the degree of coupling between said driving member and said driven member, said control comprising:
    an amplifier for energizing said field coil, said amplifier including a power transistor having a base adapted to control the conductivity thereof between a conducting state wherein said field coil is energized and a cutoff state wherein said field coil is deenergized;
    means for repetitively pulsing said power transistor between its conducting and cutoff states and for controlling the relative ratio between the periods of conduction and cutoff, thereby to variably energize said field coil, said pulsing and controlling means including:
  a D.C. power source,
  a differentiating network,
  circuit interrupting means interconnecting said power source to said differentiating network, said circuit interrupting means comprising a stationary brush in contact with a body having alternate conductive and insulating portions which are rotated by said driven member relative to said brush and adapted sequentially to connect and disconnect the D.C. power source and said differentiating network thereby to supply to said network D.C. square-wave voltage pulses having a repetition rate which is a function of the angular velocity of said driven member,
  a clipper adapted to limit the amplitude of the differentiated square-wave pulses of one polarity,
  an integrating network adapted to integrate the clipped differentiated voltage pulses to supply a pulsating D.C. signal having an average D.C. potential level which is a function of angular velocity of the driven member, said clipper interconnected between the differentiating and integrating networks,
  a D.C. potential source adapted to supply a D.C. reference voltage which has a magnitude which is a function of a preselected angular velocity of said driven member;
said control further comprising an electrical circuit interconnecting said pulsing and controlling means to said control element, said electrical circuit including a second transistor interconnected with said power transistor in a modified Schmitt circuit configuration and having a control element responsive to the difference between the magnitudes of said pulsating D.C. signal and said D.C. reference voltage for causing said power transistor to be cut off during periods when said difference in magnitude exceeds a predetermined level, whereby the relative ratio between conduction and cutoff periods of said power transistor is a function of the difference between the magnitude of said composite signal and the magnitude of said D.C. voltage and the average level of the electrical power supplied to said field coil is thereby controlled to maintain the angular velocity of said driven member substantially equal to said preselected angular velocity.

10. A control for electrical coupling apparatus as set forth in claim 9 which further includes a regenerative feedback loop interconnecting an output element of said power transistor to said control element of said second transistor.

11. A control for electrical coupling apparatus as set forth in claim 10 which further includes a differential amplifier interconnected between the integrating network and said control element of the second transistor, said differential amplifier having a first control element to which is applied said pulsating D.C. signal and a second control element to which is applied said D.C. reference potential, said differential amplifier having an output connected to the control element of said second transistor.

12. A control for electrical coupling apparatus as set forth in claim 12 in which the D.C. power source also constitutes the D.C. potential source whereby any load-induced changes in the D.C. voltage level of this D.C. power and potential source substantially equally affects the amplitudes of both the pulsating D.C. signal and the D.C. reference voltage thereby effecting a cancellation of said load-induced changes.

13. A control for electrical coupling apparatus as set forth in claim 12 in which the power transistor includes a collector and an emitter, and which apparatus further includes a reverse biasing diode serially connected in a circuit interconnecting said D.C. power and potential source with said transistor emitter-collector elements and said field coil.

References Cited by the Examiner
UNITED STATES PATENTS
3,094,202   6/1963   Issler.
3,163,272   12/1964   Baumann.

ORIS L. RADER, *Primary Examiner.*

D. X. SLINEY, *Assistant Examiner.*